United States Patent
Lafer et al.

(10) Patent No.: US 10,563,702 B2
(45) Date of Patent: Feb. 18, 2020

(54) WET-RUNNING CLUTCH UNIT

(71) Applicant: Magna Powertrain GmbH & Co KG, Lannach (AT)

(72) Inventors: Alois Lafer, Kainbach bei Graz (AT); Philipp Schlachter, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 600 days.

(21) Appl. No.: 15/290,103

(22) Filed: Oct. 11, 2016

(65) Prior Publication Data
US 2017/0108055 A1 Apr. 20, 2017

(30) Foreign Application Priority Data

Oct. 20, 2015 (DE) .................. 10 2015 220 446

(51) Int. Cl.
*F16D 13/72* (2006.01)
*F16D 13/52* (2006.01)
*F16D 13/74* (2006.01)

(52) U.S. Cl.
CPC ............ *F16D 13/72* (2013.01); *F16D 13/52* (2013.01); *F16D 13/74* (2013.01); *F16D 2300/0214* (2013.01)

(58) Field of Classification Search
CPC .......... F16D 13/52; F16D 13/72; F16D 13/74; F16D 25/123; F16D 2300/0214
See application file for complete search history.

(56) References Cited

U.S. PATENT DOCUMENTS

| | | | | |
|---|---|---|---|---|
| 4,629,050 A | * | 12/1986 | Valier | ................. F16D 25/123 188/264 B |
| 5,720,372 A | * | 2/1998 | Shino | ................. F16D 25/082 192/113.34 |

(Continued)

FOREIGN PATENT DOCUMENTS

| | | |
|---|---|---|
| CN | 1318698 A | 10/2001 |
| CN | 103842693 A | 6/2014 |

(Continued)

OTHER PUBLICATIONS

Search Report dated Jul. 9, 2018 from corresponding Chinese Patent Application No. 201610916315.X.

*Primary Examiner* — Richard M Lorence
(74) *Attorney, Agent, or Firm* — Dickinson Wright PLLC

(57) ABSTRACT

Wet-running clutch unit for a motor vehicle comprising a friction clutch with at least one first friction disc which is assigned to a drive element and at least one second friction disc which is assigned to an output element, an alternating arrangement of the first friction disc and the second friction disc forming a friction disc assembly which can be brought into a frictional connection, and a fluid distributor, the fluid distributor being arranged fixedly on the drive element and having at least one fluid chamber, the first friction disc having at least one first recess and the second friction disc having at least one second recess), the first recess of the first friction disc and the second recess of the second friction disc overlapping in the radial and axial direction, with the result that at least one friction disc assembly recess is formed, the fluid chamber of the fluid distributor being configured in such a way that it extends in the axial direction into the friction disc assembly recess.

15 Claims, 6 Drawing Sheets

(56) References Cited

U.S. PATENT DOCUMENTS

2010/0101351 A1* 4/2010 Lafer .................. B60K 17/344
74/467
2011/0036677 A1* 2/2011 Kriebernegg ........... F16D 13/52
192/70.12

FOREIGN PATENT DOCUMENTS

| DE | 102006040506 A1 | 3/2008 |
| DE | 102010019699 A1 | 12/2010 |
| DE | 102013205649 A1 | 10/2014 |
| EP | 1813831 A1 | 8/2007 |

* cited by examiner

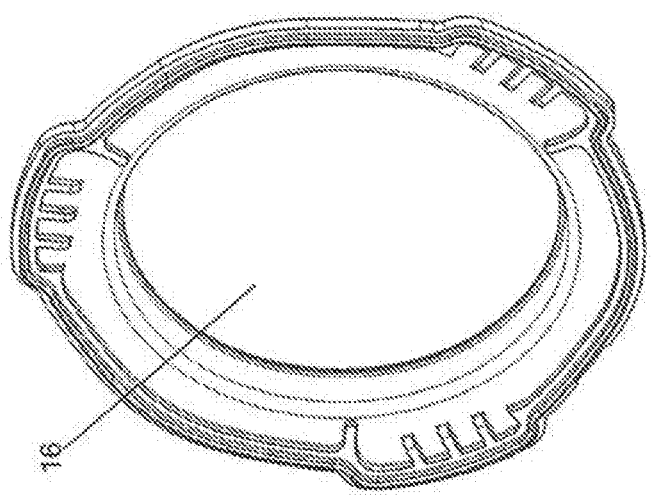
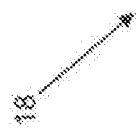
Fig. 4

WET-RUNNING CLUTCH UNIT

CROSS-REFERENCE TO RELATED APPLICATIONS

This application claims the benefit and priority of German patent application No. 102015220446.4, filed on Oct. 20, 2015. The entire disclosure of the above application is incorporated herein by reference.

TECHNICAL FIELD

The present invention relates to a wet-running clutch unit for a motor vehicle comprising a friction clutch with at least one first friction disc which is assigned to a drive element and at least one second friction disc which is assigned to an output element, an alternating arrangement of the first friction disc and the second friction disc forming a friction disc assembly which can be brought into a frictional connection, and a fluid distributor being arranged fixedly on the drive element and having at least one fluid chamber.

BACKGROUND

This section provides background information related to the present disclosure which is not necessarily prior art.

DE 10 2006 040 506 A1 describes a clutch apparatus, in particular a wet-running multiple disc clutch for a motor vehicle. The clutch apparatus has a coolant duct which extends axially in a shaft section. The coolant duct opens via a radial outflow opening into a clutch space, in which friction elements to be cooled of the clutch apparatus are arranged.

EP 1 813 831 A1 describes a cooling medium distributing device for a wet-running clutch device, and a wet-running clutch device. The wet-running clutch device has drive-side and output-side friction units which are formed from a plurality of friction partners which alternate in a layered manner in the axial direction on the drive side and on the output side and can be pressed axially against one another in order to form a frictional engagement. The wet-running clutch device comprises the cooling medium distributing device. The cooling medium distributing device has a plurality of cooling medium distributing surfaces. Cooling medium is conveyed radially to the outside along the cooling medium distributing surfaces. The cooling medium distributing surfaces are configured in such a way that the cooling medium which is conveyed radially to the outside has different axial cooling medium ejection points and/or cooling medium ejection directions. In this way, the cooling medium can be conveyed in a targeted manner to different axial positions, as a result of which a defined supply of different clutch lining elements with cooling medium is made possible.

DE 10 2013 205 649 A1 discloses a metering device for controlling an oil delivery quantity for a wet clutch, the wet clutch having at least one pair of interacting friction faces and an actuation unit for actuating the wet clutch. The actuation unit has an axially supported supporting disc and an axially displaceable pressure disc, it being possible for the pressure disc and the supporting disc to be rotated relative to one another. The metering device has a first component and a second component, the first component being connected fixedly to the housing and the second component being connected fixedly to the pressure disc so as to rotate with it and such that it can be axially displaced relative to said pressure disc. The construction of the metering device which is described in DE 10 2013 205 649 A1 achieves, in particular, a precise metering capability of a cooling fluid for the wet clutch.

SUMMARY

This section provides a general summary of the disclosure, and is not a comprehensive disclosure of its full scope or all of its features.

It is an object of the invention to specify an alternative wet-running clutch unit which has, in particular, a construction which is optimized in terms of installation space.

The object is achieved by way of a wet-running clutch unit for a motor vehicle comprising a friction clutch with at least one first friction disc which is assigned to a drive element and at least one second friction disc which is assigned to an output element, an alternating arrangement of the first friction disc and the second friction disc forming a friction disc assembly which can be brought into a frictional connection, and a fluid distributor arranged fixedly on the drive element and having at least one fluid chamber, wherein the first friction disc has at least one first recess and the second friction disc has at least one second recess, wherein the first recess of the first friction disc and the second recess of the second friction disc overlap in the radial and axial direction with the result that at least one friction disc assembly recess is formed, and wherein the fluid chamber of the fluid distributor is configured in such a way that it extends in the axial direction into the friction disc assembly recess.

The wet-running clutch unit according to the invention comprises a friction clutch and a fluid distributor.

According to the present invention, the friction clutch has a first friction disc which is assigned to a drive element and a second friction disc which is assigned to an output element, an alternating arrangement of the first friction disc and the second friction disc forming a friction disc assembly which can be brought into a frictional connection.

The friction clutch is configured, for example, as a multiple disc clutch, the friction disc assembly corresponding to the multiple disc assembly.

The drive element is a drive element which rotates about a central rotational axis, for example a drive shaft.

Drive torque can be transmitted selectively from the drive element to the output element by means of the friction clutch.

According to the invention, the fluid distributor is arranged fixedly on the drive element, that is to say fixedly so as to rotate with it and radially and axially fixed, and has at least one fluid chamber. The fluid distributor is drive-connected to the drive element via the fixed connection to the drive element—the rotation of the drive element is transmitted to the fluid distributor.

The term "radial" describes a direction perpendicularly onto the central rotational axis of the drive element.

The term "axial" describes a direction along or parallel to the central rotational axis of the drive element.

According to the present invention, the first friction disc has at least one first recess and the second friction disc has at least one second recess, wherein the first recess of the first friction disc and the second recess of the second friction disc overlap in the radial and axial direction with the result that at least one friction disc assembly recess is formed.

According to the present invention, the fluid chamber of the fluid distributor is configured in such a way that it extends in the axial direction into the friction disc assembly recess.

The fluid distributor serves substantially for feeding fluid to the friction clutch, in particular to the friction disc assembly.

The fluid is a cooling/lubricating fluid, such as oil.

The configuration according to the invention of the wet-running clutch unit permits a construction of the clutch unit which is space-saving and therefore optimized in terms of installation space; a substantial contribution to this is made by arranging the fluid chamber of the fluid distributor in the friction disc assembly recess of the friction disc assembly of the friction clutch.

In one preferred embodiment of the present invention, the fluid chamber is configured on the fluid distributor radially on the outside in relation to the central rotational axis of the drive element.

The term "radially on the outside" can be described as meaning a location which is further away from the central rotational axis of the drive element in comparison with the term "radially on the inside".

Conversely, the term "radially on the inside" can be described as meaning a location which lies closer to the central rotational axis of the drive element in comparison with the term "radially on the outside".

The fluid chamber preferably has at least one fluid outlet which lies radially on the outside in relation to the central rotational axis of the drive element.

By means of a configuration of this type of the fluid chamber and, in particular, of the fluid outlet, targeted supply of the friction disc assembly can be brought about in a simple way, as a result of which operation of the clutch unit is ensured, which operation is reliable and therefore optimized in terms of the service life.

Furthermore, the fluid distributor preferably comprises at least one fluid guiding channel which extends in the axial direction.

The fluid guiding channel is preferably configured on the fluid distributor radially on the inside in relation to the central rotational axis of the drive element.

By way of the above-described configuration of the fluid distributor with a fluid channel, it is possible in a simple way to also forward fluid via the fluid distributor to further components and/or structural units, such as bearings, etc., and therefore also to bring about cooling/lubrication of the said components and/or structural units.

According to one advantageous embodiment of the present invention, the fluid distributor is of substantially cylindrical configuration with a central opening.

The fluid distributor is preferably manufactured from plastic, a configuration of the fluid distributor made from a metallic material and/or from a composite material likewise being conceivable.

According to a further advantageous design variant of the present invention, the fluid distributor is configured in multiple pieces, from at least one fluid distributor main body and a fluid distributor cover.

The fluid chamber is preferably configured on the fluid distributor main body.

Furthermore, the fluid guiding channel is preferably configured on the fluid distributor main body.

The fluid distributor cover is connected to the fluid distributor main body and serves to seal the fluid distributor.

A single-piece construction of the fluid distributor is likewise conceivable.

In one preferred embodiment of the present invention, the fluid distributor is fluidically connected to a fluid feed system, the fluid distributor and the fluid feed system interacting in such a way that the fluid is conveyed out of the fluid feed system by way of centrifugal forces into the fluid chamber of the fluid distributor. Furthermore, the fluid distributor and the fluid feed system preferably interact in such a way that fluid flows out of the fluid feed system into the fluid guide channel of the fluid distributor.

It is particularly advantageous if the first friction disc and the second friction disc have in each case at least one friction face which lies radially on the outside in relation to the central rotational axis of the drive element, the first recess of the first friction disc and the second recess of the second friction disc being configured in each case radially on the inside in relation to the central rotational axis of the drive element.

By means of the construction of this type of the clutch unit according to the invention, the friction faces which are greatly loaded mechanically during a frictional connection of the first friction disc and the second friction disc can be cooled/lubricated, in particular.

The clutch unit according to the invention is preferably arranged in a transfer gearbox of a motor vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The invention will be described in the following text by way of example with reference to the drawings, in which:

FIG. 4 shows a perspective view of a fluid distributor cover of the fluid distributor shown in FIG. 2;

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
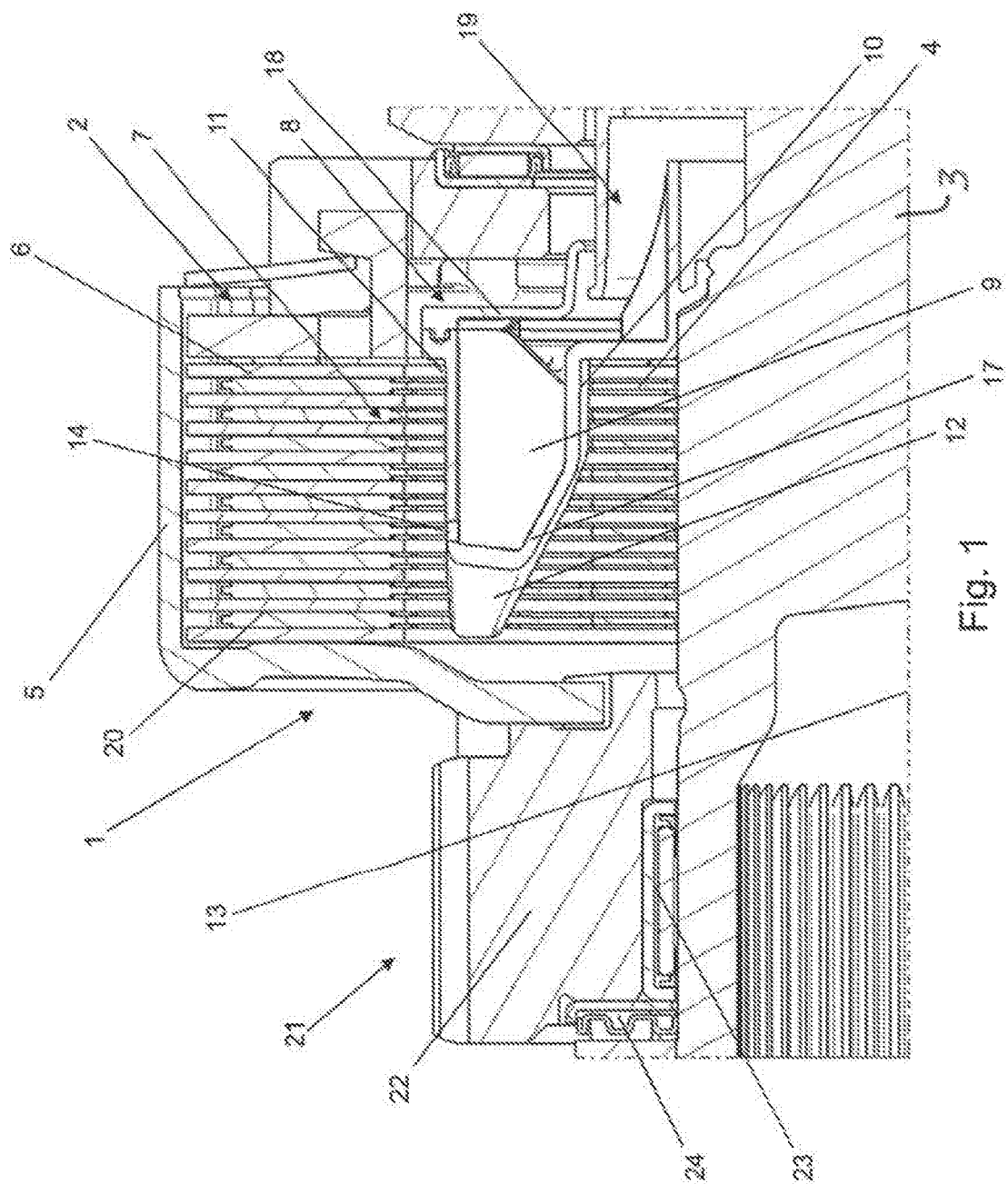
FIG. 1 illustrates a partial sectional view of an exemplary wet-running clutch unit in a transfer gearbox.

FIG. 1 shows a sectional view of a detail of an exemplary wet-running clutch unit 1 constructed according to the invention and installed in a transfer gearbox 21. The wet-running clutch unit 1 comprises a friction clutch 2 and a fluid distributor 8. The friction clutch 2 is configured as a multiple disc clutch. The friction clutch 2 has a plurality of first friction discs 4 which are assigned to a drive element 3 and a plurality of second friction discs 6 which are assigned to an output element 5. The drive element 3 is configured as a drive shaft. The drive element rotates about a central rotational axis 13. The output element 5 is configured as a clutch basket which is drive-connected to a chain sprocket 22 of the transfer gearbox 21. The chain sprocket 22 and the clutch basket are positioned via a radial needle bearing 23 and an axial needle bearing 24.

The first friction discs 4 and the second friction discs 6 are arranged in an alternating manner and can be brought selectively into a frictional connection by means of an actuating unit (not shown). The sum of all first friction discs 4 and all second friction discs 5 forms a friction disc assembly 7. In the case of a friction clutch 2 which is configured as a multiple disc clutch, the friction disc assembly 7 is also called a multiple disc assembly. Drive torque can be transmitted selectively from the drive element 3 to the output element 5 by means of the friction clutch 2.

Figure 2:
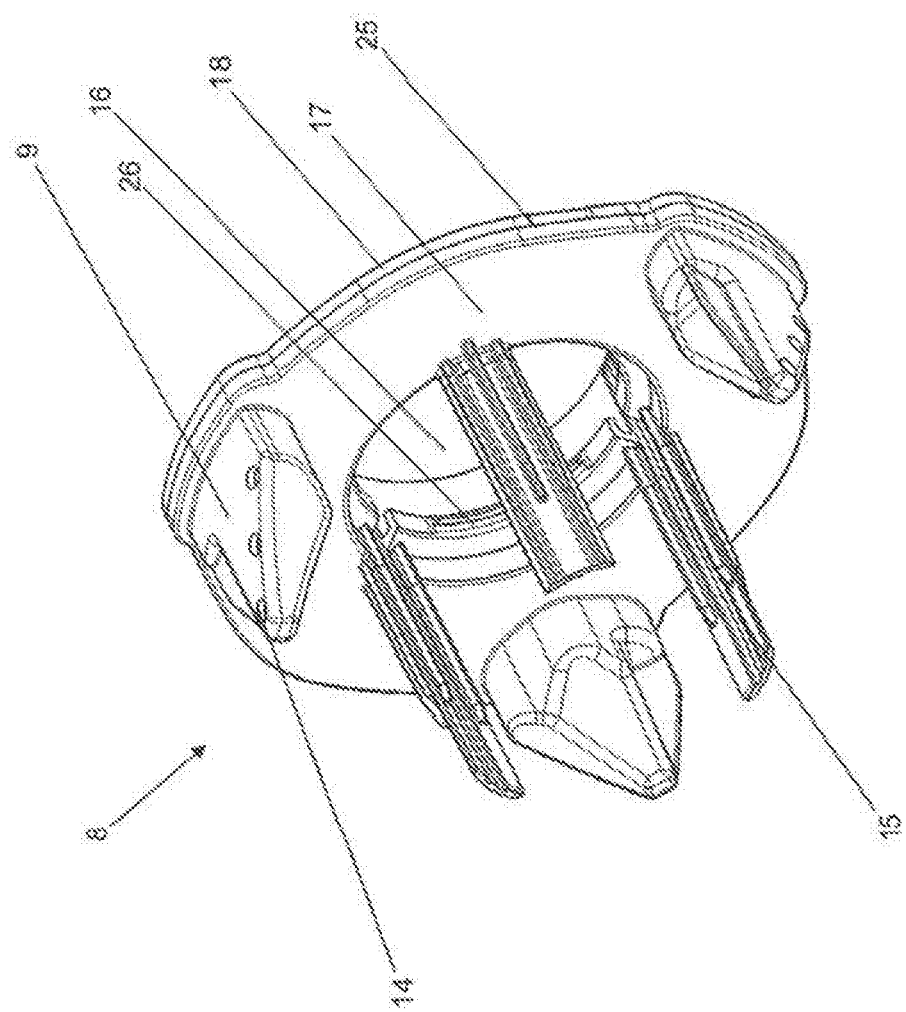
FIG. 2 shows a perspective view of an exemplary fluid distributor associated with the wet-running clutch unit and constructed according to the invention.
Figure 3:
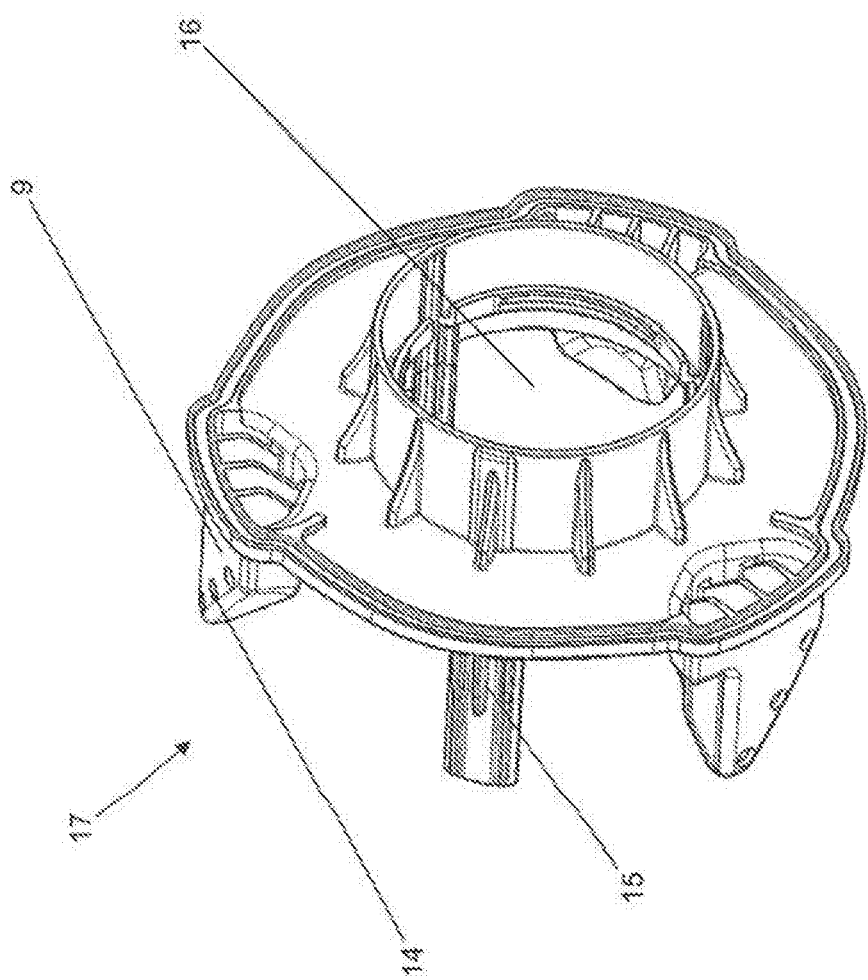
FIG. 3 shows a perspective view of a fluid distributor main body of the fluid distributor shown in FIG. 2.

The fluid distributor 8 is arranged fixedly on the drive element 3, that is to say fixedly so as to rotate with it and also radially and axially fixedly. FIG. 2 shows a perspective view of an exemplary fluid distributor 8 of the wet-running clutch unit 1 according to the invention. As shown in FIG. 2 and FIG. 3, the fluid distributor 8 has three fluid chambers 9 in the present exemplary embodiment of the wet-running clutch unit 1 according to the invention.

The fluid distributor 8 is of substantially cylindrical configuration with a central opening 16. The central opening 16 serves to arrange the fluid distributor 8 on the drive element 3. The three fluid chambers 9 are configured on the fluid distributor 8 radially on the outside in relation to the central rotational axis 13 of the drive element 3, namely in the region of the outer circumference 25 of the fluid distributor 8. Each of the three fluid chambers 9 has three fluid outlets 14 which lie radially on the outside in relation to the central rotational axis 13 of the drive element 3.

Particularly homogeneous lubrication/cooling of the friction disc assembly 7 of the friction clutch 2 can be achieved by way of a configuration of this type of the fluid chambers 9, in particular of the fluid outlets 14. Furthermore, the fluid distributor 8 has three fluid guiding channels 15 which extend in the axial direction. The fluid guiding channels 15 are configured on the fluid distributor 8 radially on the inside in relation to the central rotational axis 13 of the drive element 3, namely in the region of an inner circumference 26 of the fluid distributor 8.

The fluid distributor 8 is configured in multiple pieces, namely from a fluid distributor main body 17 and a fluid distributor cover 18. The fluid distributor cover 18 is connected fixedly to the fluid distributor main body 17 in a sealing manner with respect to the external surroundings (FIG. 2). FIG. 3 shows a perspective view of the fluid distributor main body 17 of the fluid distributor 8.

The three fluid chambers 9 are configured on the fluid distributor main body 17 such that they are spaced apart from one another uniformly in the region of the outer circumference 25 of the fluid distributor 8. Furthermore, the fluid guiding channels 15 are configured on the fluid distributor main body 17 such that they are spaced apart from one another uniformly in the region of the inner circumference 26 of the fluid distributor 8. In each case one fluid guiding channel 15 is substantially configured in the region between two fluid chambers 9, and vice versa. The fluid chambers 9 and the fluid guiding channels 15 are configured on that side of the fluid distributor 8 which faces the friction disc assembly 7.

FIG. 4 shows a perspective view of a fluid distributor cover 18 of a fluid distributor 8 which is shown in FIG. 2. The fluid distributor cover 18 forms that side of the fluid distributor 8 which faces away from the friction disc assembly 7 of the friction clutch 2. The fluid distributor cover and the fluid distributor main body have in each case one central opening 16.

In the exemplary embodiment (shown in FIG. 1) of the wet-running clutch unit 1 according to the invention, the first friction disc 4 of the friction clutch 2 has at least one first recess 10 and the second friction disc has at least one second recess 11. Each first recess 10 of the first friction disc 4 overlaps substantially in each case one second recess 11 of the second friction disc 6 in the radial and axial direction, with the result that at least one friction disc assembly recess 12 is formed.

The three fluid chambers 9 of the fluid distributor 8 are configured in such a way that they extend in each case in the axial direction, namely in each case in a direction parallel to the central rotational axis 13 of the drive element 3, into the at least one friction disc assembly recess 12. The contour of the respective friction disc assembly recess 12 corresponds substantially to the outer contour of the respective fluid chamber 9 of the fluid distributor 8.

The first friction discs 4 and the second friction discs 6 have in each case at least one friction face 20 which lies radially on the outside in relation to the central rotational axis 13 of the drive element 3, the respective first recesses 10 of the first friction discs 4 and the respective second recesses 11 of the second friction discs 6 being configured in each case radially on the inside in relation to the central rotational axis 13 of the drive element 3.

The fluid distributor 8 serves firstly to feed fluid, oil here, to the friction clutch 2, in particular to the friction disc assembly 7 of the friction clutch 2, and secondly to feed fluid to further components and/or structural components, to a radial needle bearing 23 and to an axial needle bearing 24 of the transfer gearbox 21 here. The fluid distributor 8 is fluidically connected to a fluid feed system 19. The fluid distributor 8 and the fluid feed system 19 interact in such a way that the fluid is conveyed out of the fluid feed system 19 by way of centrifugal forces into the fluid chambers 9 of the fluid distributor 8. From the fluid chambers 9, the fluid is hurled, on account of the centrifugal forces, via the fluid outlets 14 in the direction of the friction disc assembly 7 of the friction clutch 2.

Furthermore, the fluid distributor 8 and the fluid feed system 19 interact in such a way that fluid flows out of the fluid feed system 19 into the fluid guiding channel 15 of the fluid distributor 8. The three fluid guiding channels 15 of the fluid distributor 8 are configured in such a way that they extend in each case in the axial direction, namely in each case in a direction parallel to the central rotational axis 13 of the drive element 3, in the direction toward the radial needle bearing 23 and the axial needle bearing 24.

Figure 5:
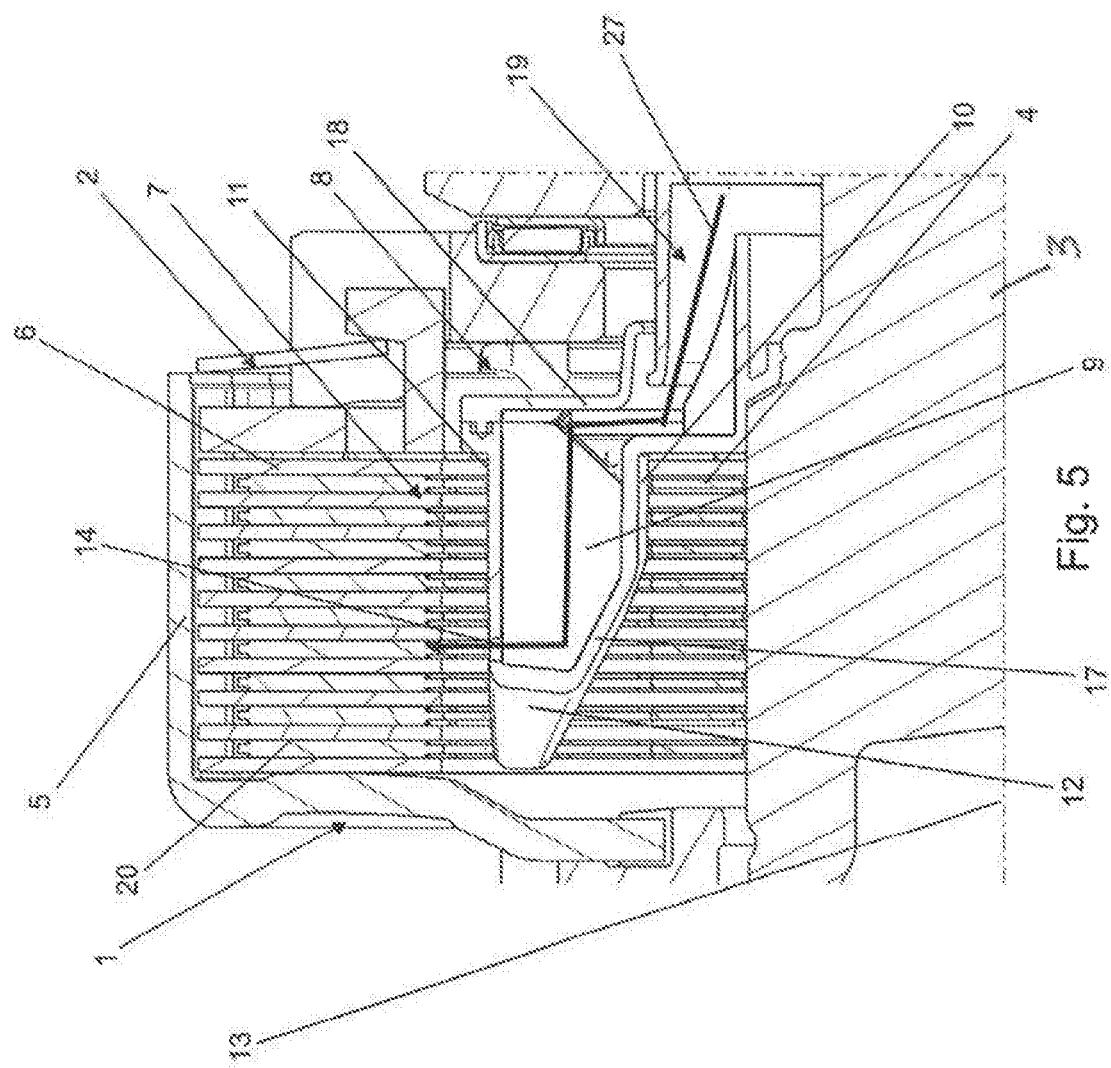
FIG. 5 shows a sectional view according to FIG. 1 with a focus on the fluid course through the fluid distributor to the friction disc assembly.

FIG. 5 shows a sectional view according to FIG. 1 with a focus on the fluid course through the fluid distributor 8 to the friction disc assembly 7. The fluid course is shown graphically in FIG. 5 by means of a first arrow 27.

Figure 6:
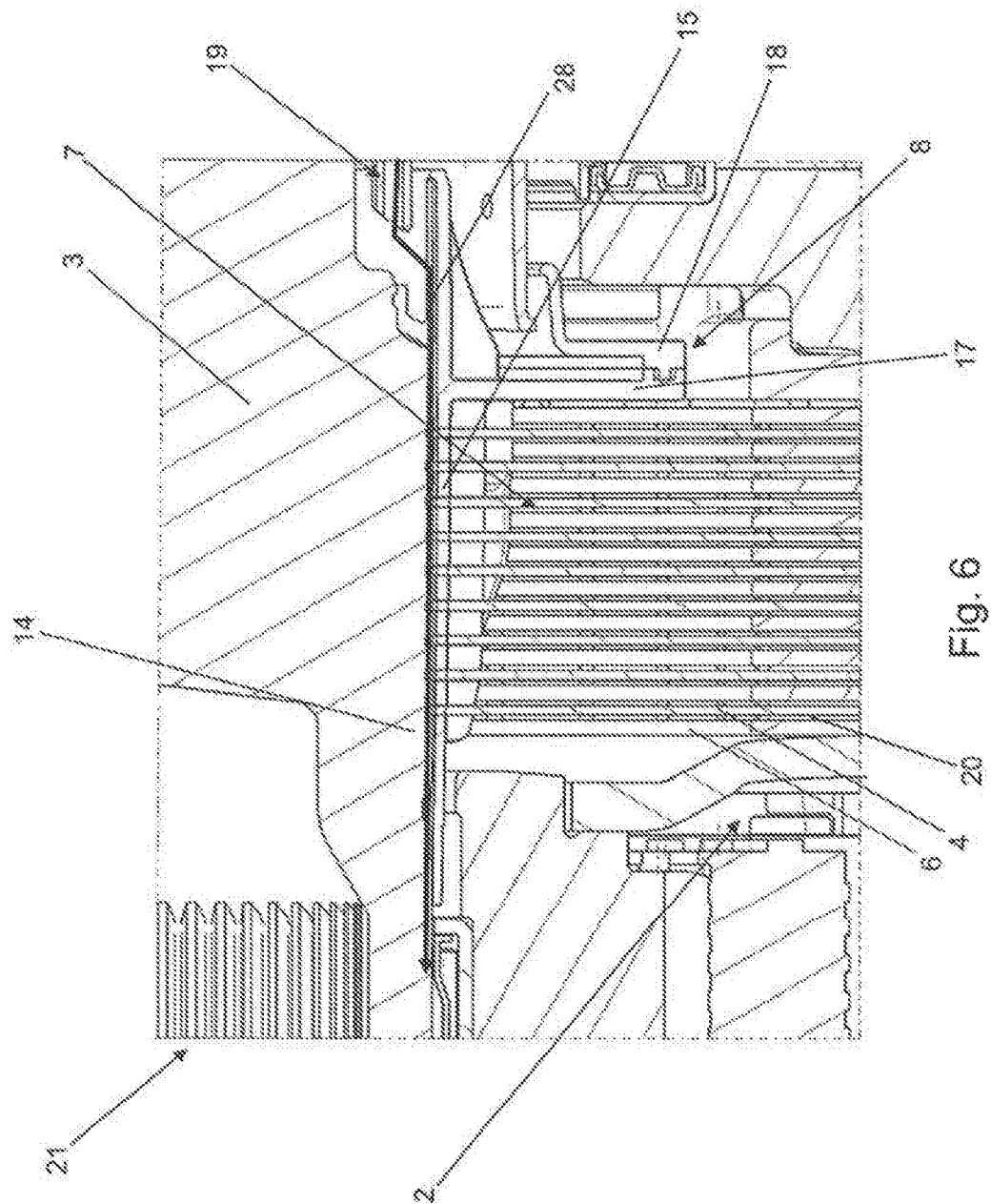
FIG. 6 shows a sectional view according to FIG. 1 with a focus on the fluid course through the fluid distributor to further components and/or structural units.

FIG. 6 shows a sectional view according to FIG. 1 with a focus on the fluid course through the fluid distributor 8 to further components and/or structural elements, a radial needle bearing 13 and an axial needle bearing 24 here, FIG. 6 showing the radial needle bearing 23 merely partially. The axial needle bearing 24 and the radial needle bearing 23 can be seen in FIG. 1. The fluid course is shown graphically in FIG. 6 by means of a second arrow 28.

On account of centrifugal forces, the fluid is conveyed from the fluid feed system 19 into the fluid distributor 8, firstly into the three fluid chambers 9 and from there via the fluid outlets 14 to the friction disc assembly 7 (fluid course according to FIG. 5, first arrow 27), and secondly into the three fluid guiding channels 15 and from there to the radial needle bearing 23 and the axial needle bearing 24 (fluid course according to FIG. 5, second arrow 28).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

1 Wet-running clutch unit
2 Friction clutch
3 Drive element
4 First friction disc
5 Output element
6 Second friction disc
7 Friction disc assembly
8 Fluid distributor
9 Fluid chamber
10 First recess (of the first friction disc)
11 Second recess (of the second friction disc)
12 Friction disc assembly recess
13 Central rotational axis (of the drive element)
14 Fluid outlet
15 Fluid guiding channel
16 Central opening
17 Fluid distributor main body
18 Fluid distributor cover
19 Fluid feed system
20 Friction face
21 Transfer gearbox
22 Chain sprocket
23 Radial needle bearing
24 Axial needle bearing
25 Outer circumference (of the fluid distributor)
26 Inner circumference (of the fluid distributor)
27 First arrow
28 Second arrow

What is claimed is:

1. A wet-running clutch unit for a motor vehicle comprising a friction clutch with at least one first friction disc which is assigned to a drive element and at least one second friction disc which is assigned to an output element, an alternating arrangement of the first friction disc and the second friction disc forming a friction disc assembly which can be brought into a frictional connection, and a fluid distributor, the fluid distributor being arranged fixedly on the drive element and having at least one fluid chamber, wherein the first friction disc has at least one first recess and the second friction disc has at least one second recess, wherein the first recess of the first friction disc and the second recess of the second friction disc overlap in the radial and axial directions with the result that at least one friction disc assembly recess is formed, and wherein the fluid chamber of the fluid distributor being configured in such a way that it extends in the axial direction into the friction disc assembly recess, and wherein a portion of the first friction disc extends radially inward of the fluid distributor.

2. The wet-running clutch unit according to claim 1, wherein the fluid chamber is configured on the fluid distributor radially on the outside in relation to a central rotational axis of the drive element.

3. The wet-running clutch unit according to claim 2, wherein the fluid chamber has at least one fluid outlet which lies radially on the outside in relation to the central rotational axis of the drive element.

4. The wet-running clutch unit according to claim 1, wherein the fluid distributor has at least one fluid guiding channel which extends in the axial direction.

5. The wet-running clutch unit according to claim 4, wherein the fluid guiding channel is configured on the fluid distributor radially on the inside in relation to a central rotational axis of the drive element.

6. The wet-running clutch unit according to claim 4, wherein the fluid distributor is configured in multiple pieces and includes a fluid distributor main body and a fluid distributor cover.

7. The wet-running clutch unit according to claim 6, wherein the fluid chamber is configured on the fluid distributor main body.

8. The wet-running clutch unit according to claim 6, wherein the fluid guiding channel is configured on the fluid distributor main body.

9. The wet-running clutch unit according to claim 4, wherein the fluid distributor is fluidically connected to a fluid feed system, the fluid distributor and the fluid feed system interacting in such a way that the fluid is conveyed out of the fluid feed system by way of centrifugal forces into the fluid chamber of the fluid distributor.

10. The wet-running clutch unit according to claim 9, wherein the fluid distributor and the fluid feed system interact in such a way that fluid flows out of the fluid feed system into the fluid guiding channel of the fluid distributor.

11. The wet-running clutch unit according to claim 1, wherein the fluid distributor is of substantially cylindrical configuration with a central opening.

12. The wet-running clutch unit according to claim 1, wherein the first friction disc and the second friction disc have in each case at least one friction face which lies radially on the outside in relation to a central rotational axis of the drive element, and wherein the first recess of the first friction disc and the second recess of the second friction disc are configured in each case radially on the inside in relation to the central rotational axis of the drive element.

13. The wet-running clutch unit according to claim 1, wherein the wet-running clutch unit is arranged in a transfer gearbox of a motor vehicle.

14. The wet-running clutch unit according to claim 1, wherein the fluid distributor is produced from plastic.

15. A wet-running clutch unit for a motor vehicle comprising:
a drive element extending along and rotatable about an axis;
an output element positioned about the drive element and rotatable about the axis;

a first friction disc fixed to and extending annularly about the drive element and extending radially outwardly from the drive element to an outer circumference;

the first friction disc defining at least one first recess radially between the drive element and the outer circumference;

a second friction disc fixed to and extending annularly along the output element and extending radially inwardly from the output element to an inner circumference, the inner circumference defining a second recess;

the first and second friction discs at least partially axially aligned with one another and axially moveable into frictional contact with one another to rotatably connect the drive element and the output element;

a fluid distributor fixed to the drive element and extending axially into the first and second recesses and defining a chamber in the first and second recesses for feeding a fluid to the first and second friction discs; and wherein a portion of the first friction disc extends radially inward of the fluid distributor.

\* \* \* \* \*